United States Patent
Shimizu et al.

(10) Patent No.: US 12,296,873 B2
(45) Date of Patent: May 13, 2025

(54) POSITION DETECTION SYSTEM, VEHICLE, AND POSITION DETECTION METHOD

(71) Applicant: MITSUBISHI HEAVY INDUSTRIES, LTD., Tokyo (JP)

(72) Inventors: Kazutaka Shimizu, Yokohama (JP); Keisuke Kimura, Yokohama (JP); Eigo Hayashi, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 925 days.

(21) Appl. No.: 17/435,537

(22) PCT Filed: Jul. 5, 2019

(86) PCT No.: PCT/JP2019/026780
§ 371 (c)(1),
(2) Date: Sep. 1, 2021

(87) PCT Pub. No.: WO2020/194775
PCT Pub. Date: Oct. 1, 2020

(65) Prior Publication Data
US 2022/0055670 A1    Feb. 24, 2022

(30) Foreign Application Priority Data
Mar. 22, 2019  (JP) ................... 2019-055370

(51) Int. Cl.
*B61L 25/02* (2006.01)
*G01C 3/02* (2006.01)

(52) U.S. Cl.
CPC .............. *B61L 25/025* (2013.01); *G01C 3/02* (2013.01)

(58) Field of Classification Search
CPC .................................. B61L 25/025; G01C 3/02
See application file for complete search history.

(56) References Cited

U.S. PATENT DOCUMENTS 7,165,748 B2 * 1/2007 Ebuchi ................. B61L 25/025
246/122 R
7,757,608 B2 * 7/2010 Kono .................... B62D 1/265
104/88.01

(Continued)

FOREIGN PATENT DOCUMENTS

CN   212807015 U  *  3/2021
CN   113758449 A  * 12/2021

(Continued)

OTHER PUBLICATIONS

PCT/ISA/210, "International Search Report for PCT International Application No. PCT/JP/2019/026780," Oct. 8, 2019.

(Continued)

*Primary Examiner* — Jason C Smith
(74) *Attorney, Agent, or Firm* — HAUPTMAN HAM, LLP

(57) ABSTRACT

This position detection system is provided with: a distance measuring sensor that is attached to a vehicle traveling along a track and is capable of measuring a distance over a predetermined range in the track width direction; an edge position detecting unit that detects an edge position in the track width direction of the track on the basis of distance measurement data from the distance measuring sensor; and a distance calculation unit that calculates a distance in the track width direction between a reference position of the track that is specified from the edge position and a reference position of the vehicle to which the distance measuring sensor is attached.

17 Claims, 12 Drawing Sheets

(56) References Cited

U.S. PATENT DOCUMENTS

| | | | |
|---|---|---|---|
| 8,433,467 B2* | 4/2013 | Ross-Martin | G05D 1/0234 701/26 |
| 9,199,654 B2* | 12/2015 | Kang | G01B 11/14 |
| 10,501,101 B2* | 12/2019 | Tsujita | B61L 3/12 |
| 10,640,134 B2* | 5/2020 | Tsujita | B61L 3/125 |
| 11,373,418 B2* | 6/2022 | Motoyama | G06T 7/20 |
| 11,505,223 B2* | 11/2022 | Kobayashi | G01S 19/40 |
| 11,525,912 B2* | 12/2022 | Choi | G01S 17/08 |
| 11,975,613 B2* | 5/2024 | Fujitani | B61L 15/0072 |
| 2006/0200280 A1* | 9/2006 | Kono | G05D 1/0234 701/19 |
| 2010/0145550 A1* | 6/2010 | Ross-Martin | G05D 1/0234 701/19 |
| 2020/0272834 A1* | 8/2020 | Motoyama | G06F 18/251 |
| 2022/0055670 A1* | 2/2022 | Shimizu | G08G 1/09 |

FOREIGN PATENT DOCUMENTS

| | | | | | |
|---|---|---|---|---|---|
| CN | 215042743 | U | * | 12/2021 | |
| CN | 216159853 | U | * | 4/2022 | |
| CN | 108045398 | B | * | 4/2024 | ............. B61F 9/005 |
| CN | 118387156 | A | * | 7/2024 | |
| JP | 2005322155 | A | * | 11/2005 | |
| JP | 2006164007 | A | * | 6/2006 | |
| JP | 3891206 | B2 | * | 3/2007 | |
| JP | 4329240 | B2 | * | 9/2009 | |
| JP | 2010013260 | A | * | 1/2010 | |
| JP | 2010-525314 | A | | 7/2010 | |
| JP | 5323051 | B | | 7/2013 | |
| JP | 6834330 | B2 | * | 2/2021 | |
| JP | 2021060944 | A | * | 4/2021 | |
| JP | 7456855 | B2 | * | 3/2024 | |
| JP | 2024057952 | A | * | 4/2024 | |
| WO | 2004/040391 | A1 | | 5/2004 | |
| WO | 2019/026714 | A1 | | 2/2019 | |
| WO | WO-2023227435 | A1 | * | 11/2023 | ............... B61K 9/08 |

OTHER PUBLICATIONS

PCT/ISA/237, "Written Opinion for PCT International Application No. PCT/JP/2019/026780," Oct. 8, 2019.

* cited by examiner ent application is National Phase of International Application No. PCT/JP2019/026780 filed Jul. 5, 2019, and claims priority from Japanese Application No. 2019-055370, filed Mar. 22, 2019, the disclosure of which is hereby incorporated by reference herein in its entirety.

POSITION DETECTION SYSTEM, VEHICLE, AND POSITION DETECTION METHOD

RELATED APPLICATIONS

The present application is National Phase of International Application No. PCT/JP2019/026780 filed Jul. 5, 2019, and claims priority from Japanese Application No. 2019-055370, filed Mar. 22, 2019, the disclosure of which is hereby incorporated by reference herein in its entirety.

TECHNICAL FIELD

The present invention relates to a position detection system, a vehicle, and a position detection method.

This application claims the right of priority based on Japanese Patent Application No. 2019-055370 filed with the Japan Patent Office on Mar. 22, 2019, the content of which is incorporated herein by reference.

BACKGROUND ART

In a vehicle of a new transportation system, which travels by supporting a vehicle body with rubber tires and driving and rotating the rubber tires, usually, a guide wheel for steering is provided in order to steer the rubber tires, which are traveling wheels, along a determined track, and the guide wheel is brought into contact with a guide rail provided along the track to cause the vehicle to be mechanically steered and travel.

It has also been devised to eliminate the guide rail as described above, by mounting a distance measuring sensor capable of measuring a distance to an object in a non-contact manner to a vehicle and causing the vehicle to travel while detecting and correcting a deviation from an ideal track (refer to, for example, Patent Document 1).

CITATION LIST

Patent Document

[Patent Document 1] Japanese Patent No. 5323051

SUMMARY OF INVENTION

Technical Subject

It is required to accurately detect the distance between an ideal position on a track and an actual position of a vehicle.

The present invention has been made in view of the above circumstances and has an object to provide a position detection system, a vehicle, and a position detection method, in which it is possible to accurately detect the distance between an ideal position on a track and an actual position of a vehicle.

Subject to be Solved

According to an aspect of the present invention, there is provided a position detection system including: a distance measuring sensor mounted to a vehicle traveling along a track and capable of measuring a distance over a predetermined range in a track width direction; an edge position detection unit that detects a position of an edge in the track width direction of the track, based on distance measurement data obtained by the distance measuring sensor; and a distance calculation unit that calculates a distance in the track width direction between a reference position of the track, which is specified from the position of the edge, and a reference position of the vehicle to which the distance measuring sensor is mounted.

Further, according to an aspect of the present invention, the distance calculation unit specifies the reference position of the track, based on positions of two or more edges which are at the same position in a vertical direction.

Further, according to an aspect of the present invention, the distance measuring sensor is mounted on a front side of a wheel in a vehicle traveling direction.

Further, according to an aspect of the present invention, the distance measuring sensor is mounted within a distance range in which an interval between the distance measuring sensor and the wheel in the vehicle traveling direction is smaller than at least a diameter of the wheel.

Further, according to an aspect of the present invention, the distance measuring sensor is mounted such that both ends of a traveling path laid along the track are included in the predetermined range.

Further, according to an aspect of the present invention, the distance measuring sensor is mounted such that a center position of the distance measuring sensor is within a range in a width direction of a wheel that rotates and moves on an upper surface of the traveling path.

Further, according to an aspect of the present invention, the distance measuring sensor is mounted to a center position in a vehicle body width direction of the vehicle.

Further, according to an aspect of the present invention, the distance measuring sensor is mounted such that upper surfaces of two traveling paths laid along the track and disposed side by side in the track width direction are included in the predetermined range.

Further, according to an aspect of the present invention, the distance measuring sensor is mounted such that both ends of a protrusion portion that is laid along the track and comes into contact with a ground shoe of the vehicle are included in the predetermined range.

Further, according to an aspect of the present invention, the distance measuring sensor is mounted to each of both ends in the vehicle body width direction of the vehicle.

Further, according to an aspect of the present invention, the distance measuring sensor includes a tangent line between each of side walls laid at both ends of the track and a track floor in the predetermined range.

Further, according to an aspect of the present invention, the distance measuring sensor is mounted so as to include an index part provided on the track as a target of distance measurement by the distance measuring sensor.

Further, according to an aspect of the present invention, the distance measuring sensor irradiates detection light in a plurality of directions from a irradiation source within the predetermined range.

Further, according to an aspect of the present invention, the distance measuring sensor is mounted such that a surface of the track, which is not irradiated with the detection light due to the detection light being shielded, is created.

Further, according to an aspect of the present invention, the edge position detection unit the edge position detection unit specifies a portion in which a distance from the distance measuring sensor to an irradiation spot changes discontinuously with respect to scanning with the detection light in the plurality of directions, or a portion in which a slope of a distance changes discontinuously, as an edge position.

Further, according to an aspect of the present invention, the position detection system further includes a steering control unit that controls a steering mechanism of the vehicle such that the distance becomes small.

Further, according to an aspect of the present invention, the position detection system further includes a cover surrounding the distance measuring sensor and having a bottom surface that is open.

Further, according to another aspect of the present invention, there is provided a vehicle including the position detection system described above.

Further, according to still another aspect of the present invention, there is provided a position detection method including: a step of detecting a position of an edge in a track width direction of a track, based on distance measurement data obtained by a distance measuring sensor mounted to a vehicle traveling along the track and capable of measuring a distance over a predetermined range in the track width direction; and a step of calculating a distance in the track width direction between a reference position of the track, which is specified from the position of the edge, and a reference position of the vehicle to which the distance measuring sensor is mounted.

Advantageous Effects of Invention

According to each aspect of the present invention, it is possible to accurately detect the distance between an ideal position on the track and an actual position of the vehicle.

DESCRIPTION OF EMBODIMENTS

First Embodiment

Figure 1:
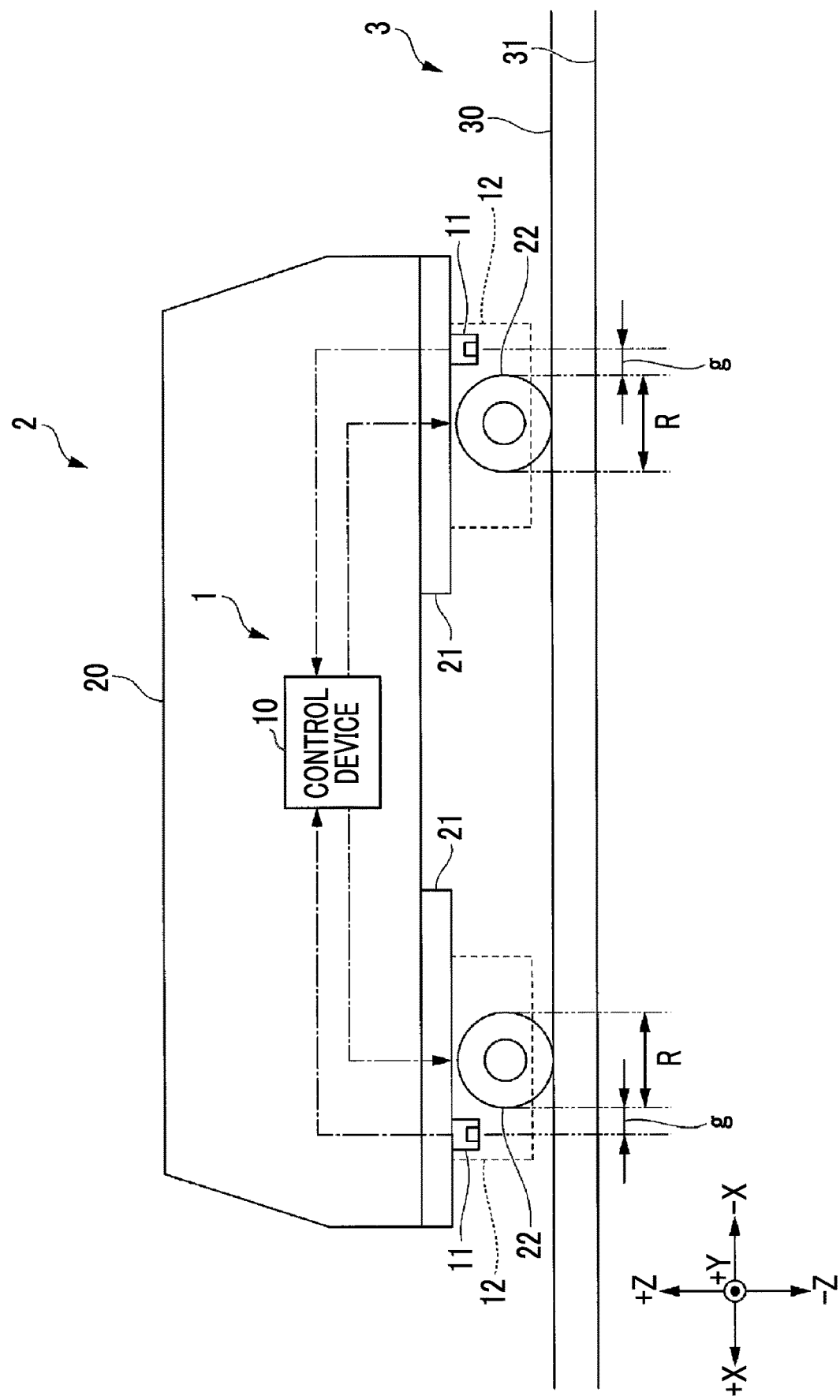
FIG. 1 is a diagram showing an overall configuration of a vehicle and a track according to a first embodiment.

Hereinafter, a steering system and a vehicle according to a first embodiment will be described with reference to FIGS. 1 to 5. In each drawing, identical or corresponding configurations are denoted by the same reference numerals, and description thereof is omitted appropriately.

(Overall Configuration of Vehicle and Track)

Figure 2:
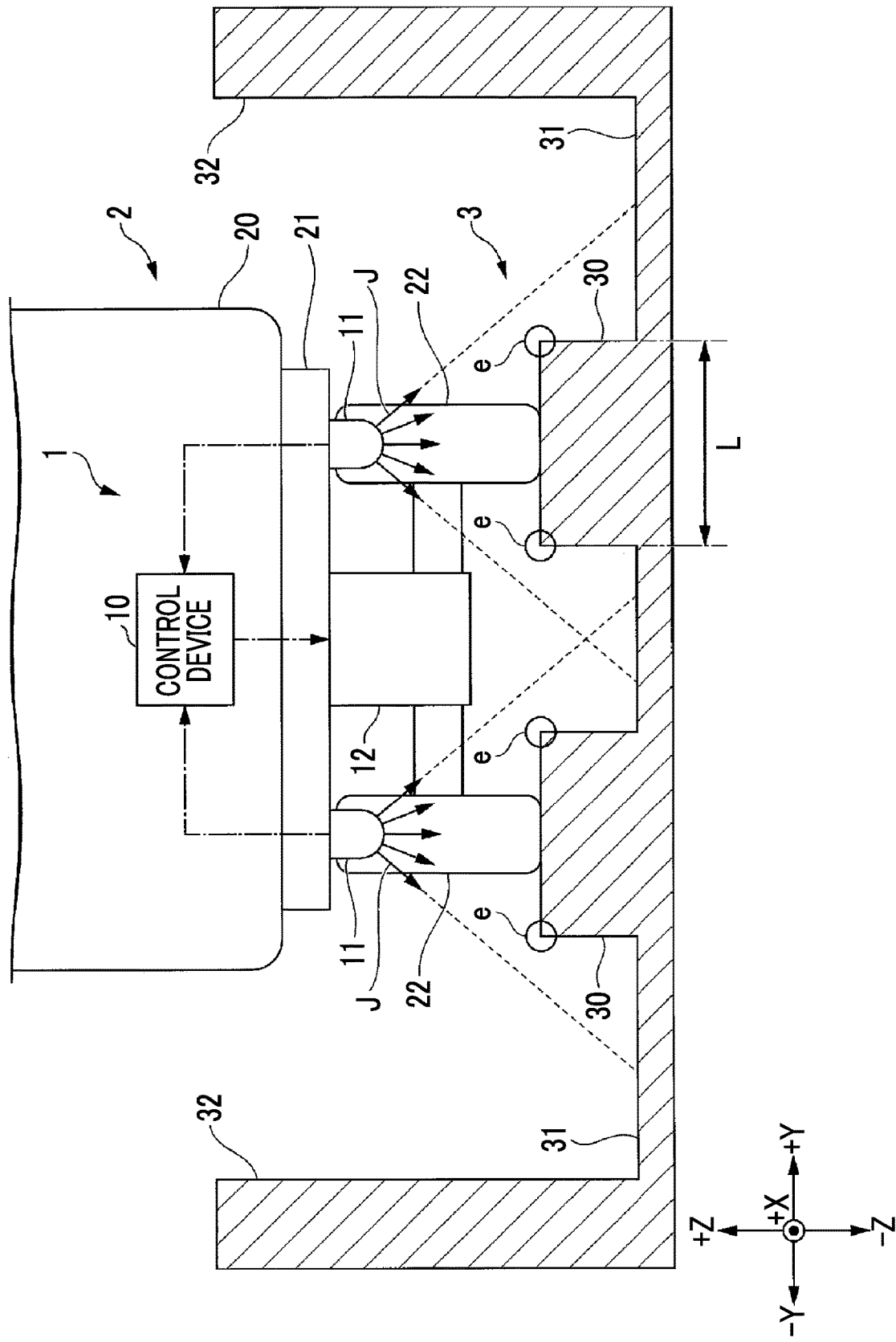
FIG. 2 is a diagram showing an overall configuration of the vehicle and the track according to the first embodiment.

FIGS. 1 and 2 are diagrams showing the overall configuration of a vehicle and a track according to the first embodiment.

A vehicle 2 shown in FIGS. 1 and 2 is a track-based vehicle configuring a track-based transportation system, and travels along a track 3 determined in advance. In FIGS. 1 and 2, it is assumed that the track 3 extends in a ±X direction. In the following description, the ±X direction shown in each drawing is also referred to as a "vehicle traveling direction" or a "track direction". Further, a ±Y direction orthogonal to the ±X direction on the horizontal plane is also referred to as a "vehicle width direction" or a "track width direction". Further, a ±Z direction orthogonal to the horizontal plane (a XY plane) is also referred to as a "height direction".

The vehicle 2 includes a vehicle body 20, a bogie 21, and rubber tires 22 (wheels).

The vehicle body 20 is a structure capable of accommodating users (passengers) or the like of the track-based transportation system. The bogie 21 is provided with a shock absorbing mechanism, a traveling mechanism (the rubber tires 22, a distance measuring sensor 11, a steering mechanism 12, and the like, which will be described later), or the like, and is installed at a lower layer of the vehicle body 20. The rubber tires 22 are wheels which are provided at the bogie 21 and rotates and moves on a predetermined surface (the upper surface of a traveling path 30 to be described later) of the track 3.

The vehicle 2 is provided with a steering system 1. The steering system 1 includes a function as a position detection system that detects the positional relationship between the vehicle 2 and the track 3.

The steering system 1 automatically performs steering control such that the vehicle 2 travels along the track 3. The steering system 1 includes a control device 10, the distance measuring sensor 11, and the steering mechanism 12.

The control device 10 acquires distance measurement data from the distance measuring sensor 11 and outputs a steering command according to the distance measurement data to the steering mechanism 12. The details of the function of the control device 10 will be described later.

The distance measuring sensor 11 is a two-dimensional laser scanner capable of performing scanning with detection light (laser) along the track width direction (the ±Y direction) and measuring a distance to a target irradiated with the detection light. As shown in FIG. 2, the distance measuring sensor 11 irradiates detection light J in a plurality of directions over a predetermined range (hereinafter, also referred to as a "scanning range") in the track width direction. Then, the distance measuring sensor 11 measures the distance to an irradiation spot of the detection light J irradiated in each direction, and acquires distance measurement data. Here, the "distance measurement data" in the present embodiment means a group of a series of distance measurement results obtained from the plurality of detection lights J irradiated during one-time scanning.

The positional relationship between the distance measuring sensor 11 and the rubber tire 22 mounted on the +X direction side of the vehicle 2 will be described with reference to FIG. 1. The distance measuring sensor 11 is mounted on the +X direction side with respect to the rubber tire 22. That is, in a case where the vehicle 2 travels in the +X direction, the distance measuring sensor 11 is mounted on the front side (the +X direction side) in the vehicle traveling direction (the ±X direction). Further, the distance measuring sensor 11 is mounted within a distance range in which an interval g between the distance measuring sensor 11 and the rubber tire 22 in the vehicle traveling direction is smaller than at least a diameter R of the rubber tire 22.

Next, the positional relationship between the distance measuring sensor 11 and the rubber tire 22 mounted on the −X direction side of the vehicle 2 will be described. The distance measuring sensor 11 is mounted on the −X direction side with respect to the rubber tire 22. That is, in a case where the vehicle 2 travels in the −X direction, the distance measuring sensor 11 is mounted on the front side (the −X direction side) in the vehicle traveling direction (the ±X direction). Further, the distance measuring sensor 11 is mounted within a distance range in which an interval g between the distance measuring sensor 11 and the rubber tire 22 in the vehicle traveling direction is smaller than at least a diameter R of the rubber tire 22.

As shown in FIG. 2, the distance measuring sensor 11 is mounted to the bogie 21 corresponding to each of the two rubber tires 22 disposed at the right and left in the vehicle width direction (the ±Y direction). Each distance measuring sensor 11 is mounted at the same position as the position of each rubber tire 22 in the vehicle width direction.

Further, two edges e which are at both ends of the traveling path 30 (described later) in the track width direction are included within the scanning range of the distance measuring sensor 11.

The steering mechanism 12 has an actuator, and the actuator is driven in response to a steering command from the control device 10. In this way, the direction of the rubber tire 22 is changed by the amount according to the steering command, and thus the steering of the vehicle 2 is performed.

As shown in FIGS. 1 and 2, the track 3 has the traveling path 30 laid along the track direction (the ±X direction), a track floor 31, and a side wall 32.

Two traveling paths 30 are disposed side by side in the track width direction (the ±Y direction) corresponding to the right and left rubber tires 22 in the vehicle width direction (the ±Y direction) of the vehicle 2. Each of the traveling paths 30 extends in the track direction (the ±X direction) while having a constant width (width L) in the track width direction. The traveling path 30 forms a surface higher than the surface of the track floor 31 by a predetermined height, and both ends thereof are at the same position (height) in the vertical direction. Each rubber tire 22 of the vehicle 2 moves while rotating on the upper surface of each traveling path 30.

(Functional Configuration of Steering System)

Figure 3:
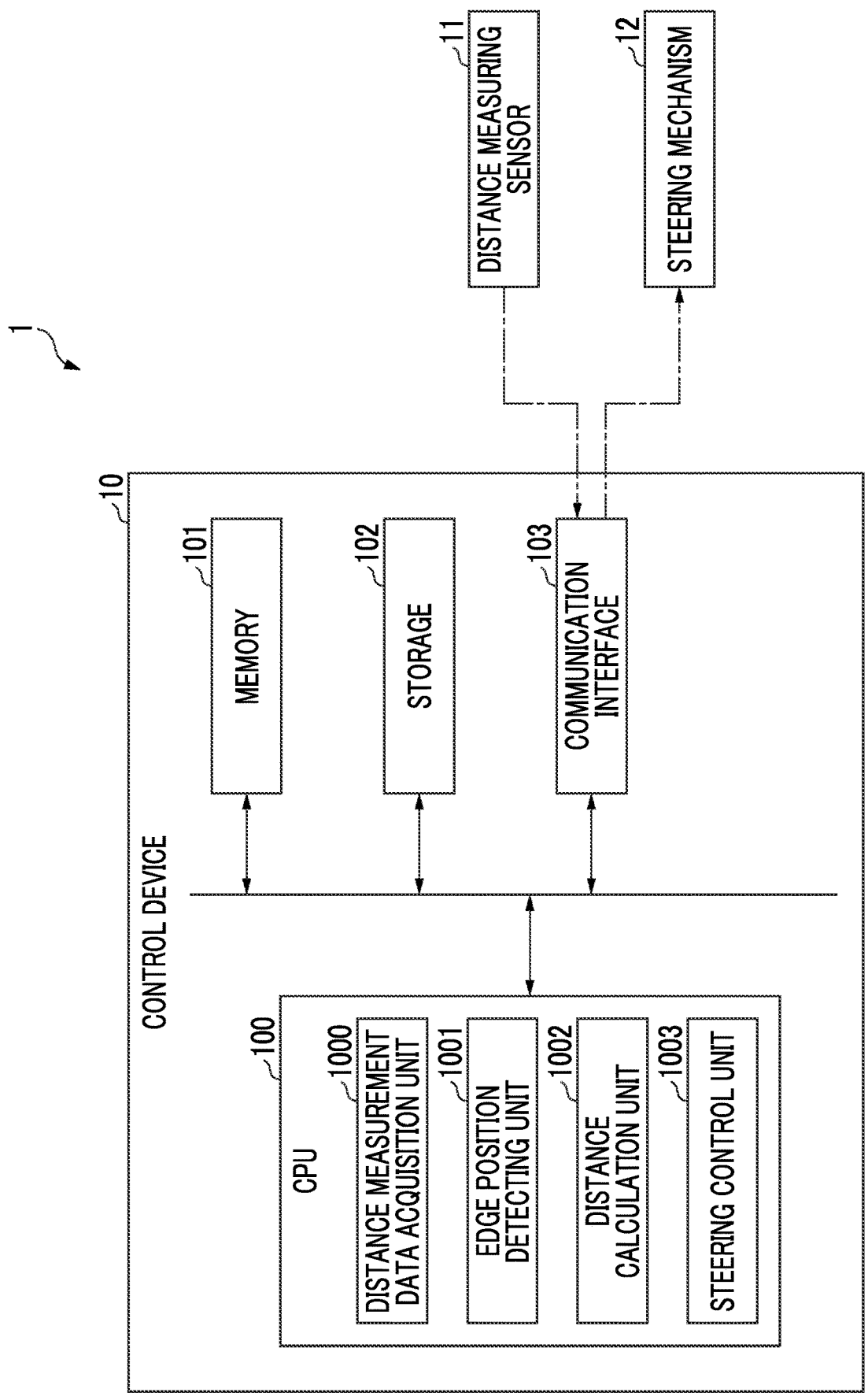
FIG. 3 is a diagram showing a functional configuration of a steering system according to the first embodiment.

FIG. 3 is a diagram showing a functional configuration of the steering system according to the first embodiment.

As shown in FIG. 3, the control device 10 includes a CPU 100, a memory 101, a storage 102, and a communication interface 103.

The CPU 100 is a processor that operates according to a program, and controls the entire operation of the steering system 1.

The memory 101 is a so-called main storage device, and provides a temporary storage area for instructions or data that is handled by the CPU 100.

The storage 102 is a so-called large-capacity auxiliary storage device, and is an SSD, an HDD, or the like.

The communication interface 103 is an interface of a communication network for exchanging information between the distance measuring sensor 11 and the steering mechanism 12.

The CPU 100 operates according to a predetermined program, thereby exerting functions as a distance measurement data acquisition unit 1000, an edge position detection unit 1001, a distance calculation unit 1002, and a steering control unit 1003.

The distance measurement data acquisition unit 1000 acquires the distance measurement data from the distance measuring sensor 11.

The edge position detection unit 1001 detects the positions of two edges (the two edges e shown in FIG. 2) provided at a predetermined interval in the track width direction (the ±Y direction) of the track 3, based on the distance measurement data by the distance measuring sensor 11.

Here, the "edge" refers to a tangent line at which two surfaces facing in different directions of the surfaces of the structure (the traveling path 30, the track floor 31, and the side wall 32) configuring the track 3 intersect each other. It is assumed that the tangent line between the side surface of the traveling path 30 and the track floor 31 and the tangent line between the side surface of the side wall 32 and the track floor 31 are also included in the concept of the "edge".

Further, the "edge" can also be interpreted as a point where the gradient of a vertical direction (±Z direction) position in the track width direction on the surface of the structure configuring the track 3 becomes discontinuous.

The distance calculation unit 1002 calculates a distance (deviation) in the track width direction (the ±Y direction) between the reference position of the track 3, which is specified from the positions of the two edges, and the reference position of the vehicle 2 to which the distance measuring sensor 11 is mounted.

The steering control unit 1003 controls the steering mechanism 12 by feedback control such that the deviation calculated by the distance calculation unit 1002 becomes small. The steering control unit 1003 may perform steering by combination of the feedback control for performing steering such that the deviation becomes small and feedforwad control based on track information prepared in advance.

(Detailed Description of Function of Control Device)

Figure 4:
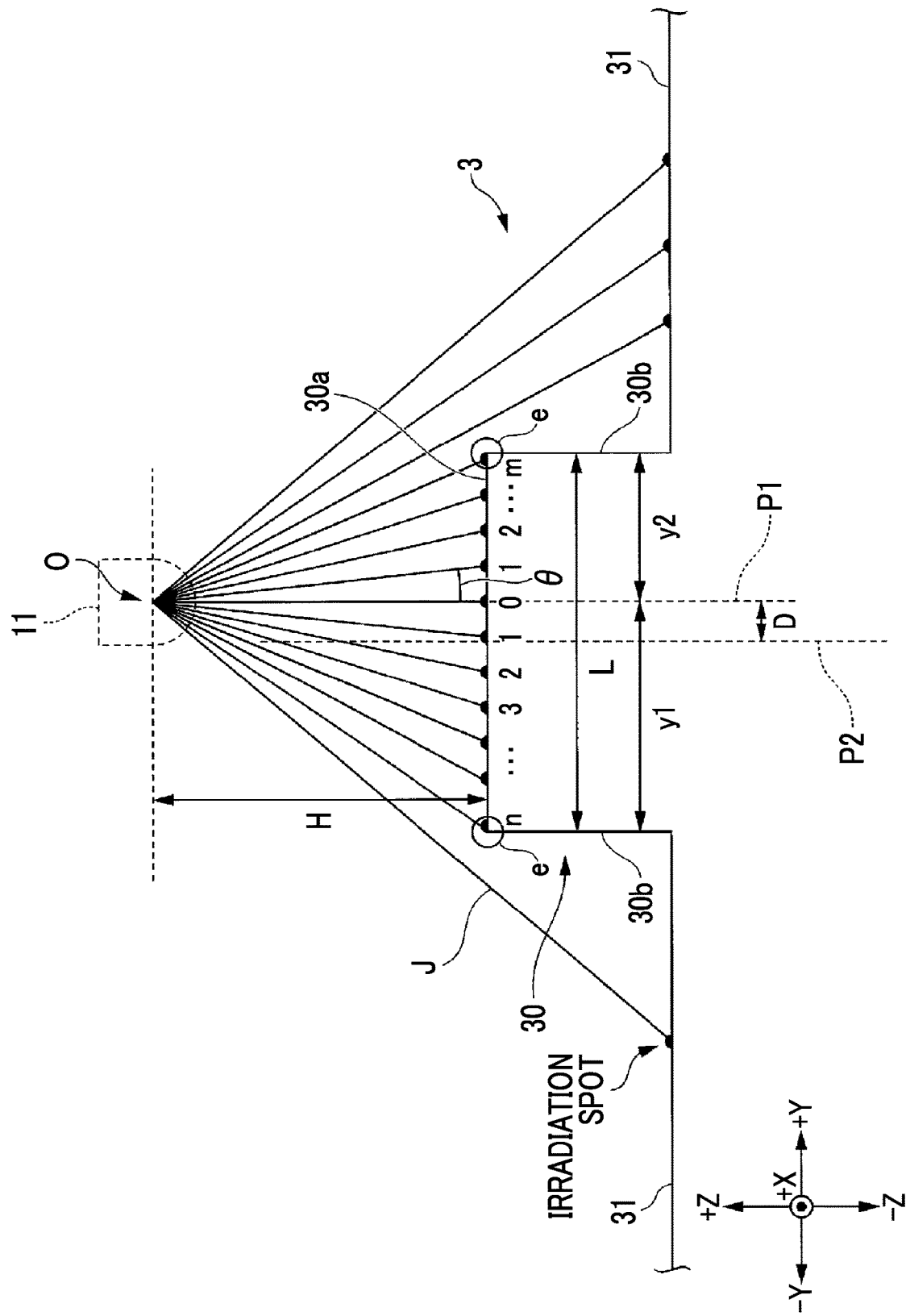
FIG. 4 is a diagram that is used for a detailed description of a function of a control device according to the first embodiment.
Figure 5:
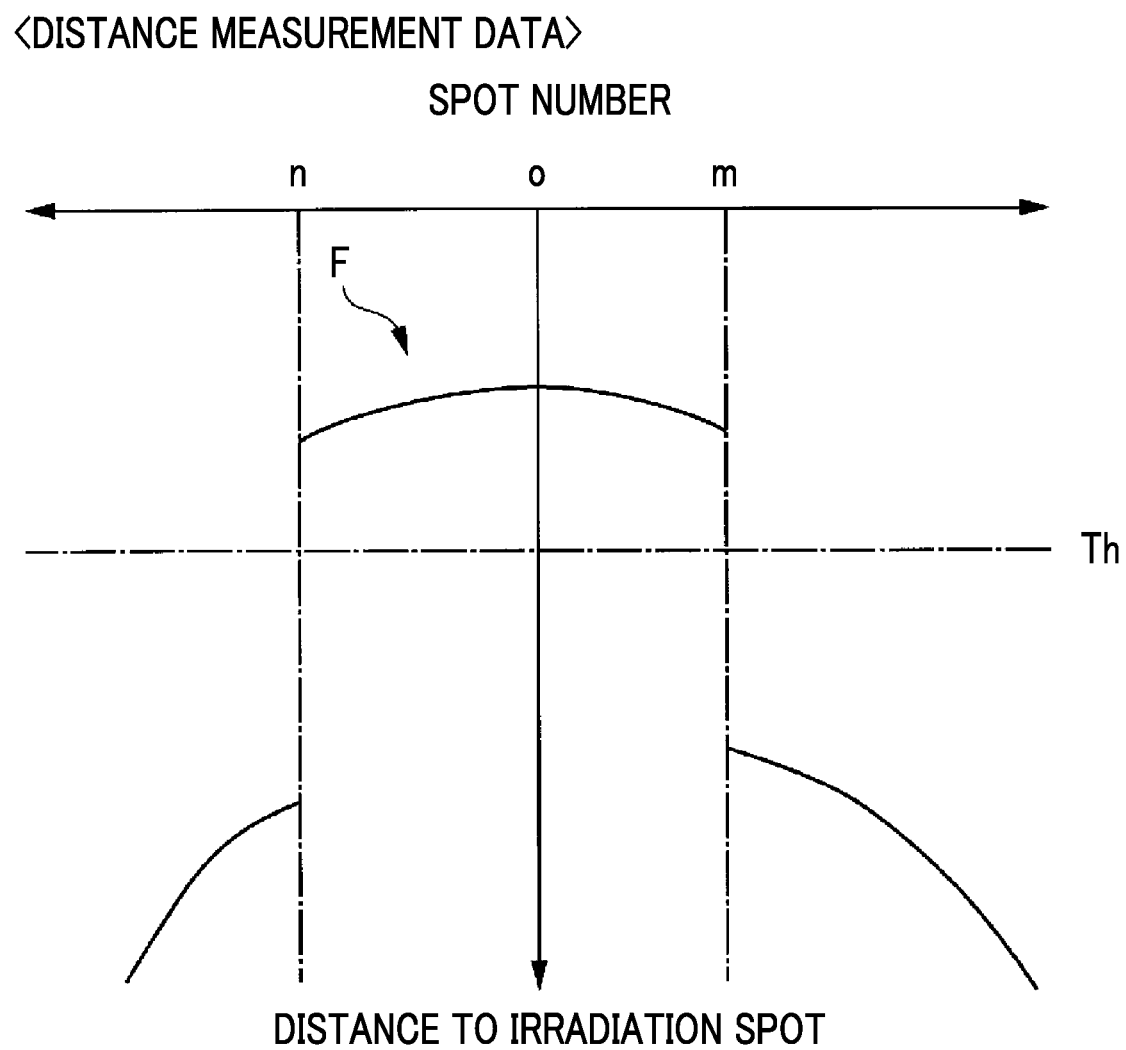
FIG. 5 is a diagram that is used for a detailed description of the function of the control device according to the first embodiment.

FIGS. 4 and 5 are diagrams that are used for a detailed description of the function of the control device according to the first embodiment.

FIG. 4 is a schematic diagram showing the structural relationship between each detection light J that is irradiated from the distance measuring sensor 11 and the track 3 that includes the traveling path 30 and the track floor 31. FIG. 5 is a graph showing an example of the distance measurement data that is acquired by the distance measuring sensor 11.

In FIG. 4, the width of the traveling path 30 in the track width direction (the ±Y direction) is a known width L [mm]. The height from an upper surface 30a of the traveling path 30 to a irradiation source O (the point from which the detection light J is irradiated) of the distance measuring sensor 11 is a height H [mm]. However, the height H may change due to vibration or the like during the traveling of the vehicle 2. An angle interval of each detection light J that is irradiated from the distance measuring sensor 11 is set to be an angle θ [rad]. This angle θ is a known value that is determined by the mechanical structure and setting of the distance measuring sensor 11.

The position in the track width direction of an irradiation spot of the detection light J that is irradiated vertically downward (in the −Z direction) from the irradiation source O of the distance measuring sensor 11 is set to be a sensor center position P1, and the spot number of the irradiation spot is determined to be the "0th". The edge position detection unit 1001 specifies the spot number (mth) of the irradiation spot closest to the edge e on the +Y direction side from the 0th irradiation spot, and the spot number (nth) of the irradiation spot closest to the edge e on the −Y direction side from the 0th irradiation spot.

A method of specifying the spot number (mth) of the irradiation spot closest to the edge e on the +Y direction side and the spot number (nth) of the irradiation spot closest to the edge e on the −Y direction side will be described in detail with reference to FIG. 5.

FIG. 5 is a diagram showing an example of the distance measurement data that is acquired based on one-time scanning by the distance measuring sensor 11, and shows the relationship between the spot number and the distance from the irradiation source O to each irradiation spot with a graph F. Here, as shown in FIG. 4, the distance measuring sensor 11 irradiates the detection light J radially from the irradiation source O located above the traveling path 30 (on the +Z direction side) toward the traveling path 30 and the track floor 31. Then, the detection light J is shielded by the upper surface 30a of the traveling path 30, and thus a side surface 30b and an area of a part of the track floor 31 are not irradiated with the detection light J. Therefore, "jumping" occurs in the distance to each irradiation spot with the edge e as a boundary, and the graph F changes discontinuously corresponding to the position of the edge e, as shown in FIG. 5. The edge position detection unit 1001 extracts a region in which the distance to the irradiation spot becomes equal to or less than a predetermined determination threshold value Th (that is, a region in which the upper surface 30a of the traveling path 30 is irradiated with the detection light J), of the graph F, and specifies the spot numbers m and n corresponding to end portions of the region.

Returned to FIG. 4 as a drawing for reference. When the edge position detection unit 1001 specifies the spot numbers m and n, then, the edge position detection unit 1001 calculates positions y1 and y2 of the edges e with respect to the sensor center position P1 by calculating Expression (1) by using the known height H, the angle θ, and the spot numbers m and n.

[Expression 1]

$$y1 = H \times \tan(n \times \theta)$$

$$y2 = H \times \tan(m \times \theta) \quad (1)$$

Next, the distance calculation unit 1002 calculates the distance (deviation D) between the sensor center position P1 and the traveling path center position P2 by calculating Expression (2) by using the positions y1 and y2 of the edges e detected by the edge position detection unit 1001 and the known width L.

[Expression 2]

$$\begin{aligned} D &= L/2 - (L \times y1)/(y1 \times y2) \\ &= L/2 - (L \times H \times \tan(n \times \theta))/(H \times \tan(n \times \theta) + H \times \tan(m \times \theta)) \\ &= L/2 - (L \times \tan(n \times \theta))/(\tan(n \times \theta) + \tan(m \times \theta)) \end{aligned} \quad (2)$$

The steering control unit 1003 outputs a control command toward the steering mechanism 12 such that the deviation D calculated by the distance calculation unit 1002 becomes small. In this way, steering is performed such that the sensor center position P1 in the track width direction (the ±Y direction) coincides with the traveling path center position P2. Here, the sensor center position P1 is regarded as the same position as the center position of the rubber tire 22 in the vehicle width direction. Therefore, the steering mechanism 12 is controlled such that the sensor center position P1 coincides with the traveling path center position P2, and thus the center position of the rubber tire 22 always coincides with the traveling path center position P2 during traveling.

The steering system 1 according to the first embodiment has an aspect in which the distance measuring sensors 11 are mounted corresponding to the right and left rubber tires 22, respectively, and the deviation D is calculated with respect to the set of each of the right and left distance measuring sensors 11 and the traveling path 30. In this case, the steering control unit 1003 may calculate, for example, the average value of the two deviations D and perform the feedback control of steering, based on the average value of the deviations D, or may perform the feedback control of steering, based on the value of only one of the two deviations D. In a case of performing the feedback control of steering, based on the value of only one of the two deviations D, the other value may be treated as a backup.

Further, in a modification example of the first embodiment, the distance measuring sensor 11 may have an aspect in which it is mounted to only one of the right and left sides of the vehicle 2.

(Operation and Effects)

As described above, the steering system 1 (position detection system) according to the first embodiment includes: the distance measuring sensor 11 that is mounted to the vehicle 2 traveling along the track 3 and can measure a distance over a predetermined range in the track width direction; the edge position detection unit 1001 that detects the position of the edge e in the track width direction of the track 3, based on the distance measurement data by the distance measuring sensor 11; and the distance calculation unit 1002 that calculates the distance (deviation D) in the track width direction between the reference position (the traveling path center position P2) of the track 3, which is specified from the position of the edge e, and the reference position (the sensor center position P1) of the vehicle 2 to which the distance measuring sensor 11 is mounted.

In this way, the steering system 1 according to the present embodiment can calculate the position (that is, the deviation D) of the traveling path center position P2 with respect to the position of the distance measuring sensor 11 (the sensor center position P1), based on the position of the edge e in the track width direction.

From the above, according to the steering system 1 of the first embodiment, it is possible to accurately detect the distance between an ideal position on the track and an actual position of the vehicle.

Further, according to the steering system 1 of the first embodiment, the distance calculation unit 1002 specifies the reference position of the track 3, based on the positions of two edges e, which are at the same position in the vertical direction, detected by the edge position detection unit 1001.

In this way, the steering system 1 can obtain the deviation D without using the "height H" (refer to Expression (2)). In this way, even in a case where a fluctuation occurs in the interval in the height direction between the distance measuring sensor 11 and the upper surface 30a of the traveling path 30 due to the vibration or the like of the vehicle 2, the deviation D can be accurately calculated without being affected by the fluctuation. The vehicle 2 traveling with the rubber tires 22 has larger vibration with respect to the height H during traveling, as compared with a normal railway vehicle. Although the vehicle 2 according to the present embodiment is a vehicle traveling with the rubber tires 22, the vehicle 2 is equipped with the steering system 1, so that the reference position of the track 3 can be accurately specified without being affected by large vibration in the height direction.

Further, the distance measuring sensor 11 according to the first embodiment is mounted on the front side of the rubber tire 22 in the vehicle traveling direction.

In this way, the deviation D can be sensitively detected at a position before the rubber tire 22. In this way, the control performance by feedback can be improved.

Further, the distance measuring sensor 11 according to the first embodiment is mounted within a distance range in which the interval g between the distance measuring sensor 11 and the rubber tire 22 in the vehicle traveling direction is smaller than at least the diameter R of the rubber tire 22 (that is, within a range satisfying the relationship g<R).

In this way, the distance between the rubber tire 22 and the distance measuring sensor 11 becomes short, so that it is possible to restrain the detection sensitivity of the deviation D from becoming excessive. Further, it is possible to restrain the deviation D from being detected too few or too much at a corner of the track 3.

Further, the distance measuring sensor 11 according to the first embodiment is mounted such that both ends (edges e) of the traveling path 30 laid along the track 3 are included in the scanning range.

In this way, the control device 10 can specify the positions of both ends of the traveling path 30 as the edges e, based on the distance measurement data that is acquired from the distance measuring sensor 11.

Further, the distance measuring sensor 11 according to the first embodiment is mounted at the same position as the position in the track width direction of the rubber tire 22 that rotates and moves on the upper surface 30a of the traveling path 30.

In this way, the sensor center position P1 structurally coincides with the center position of the rubber tire 22. Therefore, the deviation D between the sensor center position P1 and the traveling path center position P2 can be directly treated as the deviation between the center position of the rubber tire 22 and the traveling path center position P2. The distance measuring sensor 11 according to another embodiment may be mounted such that the center position of the distance measuring sensor 11 (the sensor center position P1) is within the range in the width direction of the rubber tire 22. Even in this way, the deviation D can be treated as the deviation between the value obtained by adding the distance between the sensor center position P1 and the center position of the rubber tire 22 to the sensor center position P1 and the traveling path center position P2, and the same effect as the above effect can be exhibited.

Further, the distance measuring sensor 11 according to the first embodiment is a laser scanner that irradiates the detection light J (laser) in a plurality of directions starting from the irradiation source O within a predetermined scanning range.

In this way, the control device 10 can specify the position of the edge e which is included in the scanning range in the track width direction of the track 3.

Further, the distance measuring sensor 11 according to the first embodiment is mounted such that a surface of the track 3, which is not irradiated with the detection light J due to the detection light J being shielded by the irregularity (the traveling path 30) of the track 3, is created in the scanning range.

In this way, in one-time scanning, the distance to the irradiation spot changes discontinuously with the edge e as a boundary. Therefore, the edge position can be accurately specified only by extracting a location of the distance measurement data where the distance changes discontinuously.

Further, the edge position detection unit 1001 according to the first embodiment specifies a portion where the distance from the distance measuring sensor 11 to the irradiation spot changes discontinuously with respect to the scanning with the detection light J in a plurality of directions as an edge position.

In this way, the edge position can be accurately specified from the distance measurement data with simple processing.

Further, the steering system 1 according to the first embodiment further includes the steering control unit 1003 that controls the steering mechanism 12 of the vehicle 2 such that the deviation D becomes small.

In this way, the vehicle can automatically travel along the reference position of the track 3 by the automatic steering control based on the feedback control.

Second Embodiment

Next, a steering system and a vehicle according to a second embodiment will be described with reference to FIGS. 6 and 7. In each drawing, identical or corresponding configurations are denoted by the same reference numerals, and description thereof is omitted appropriately.
(Overall Configuration of Vehicle and Track)

Figure 6:
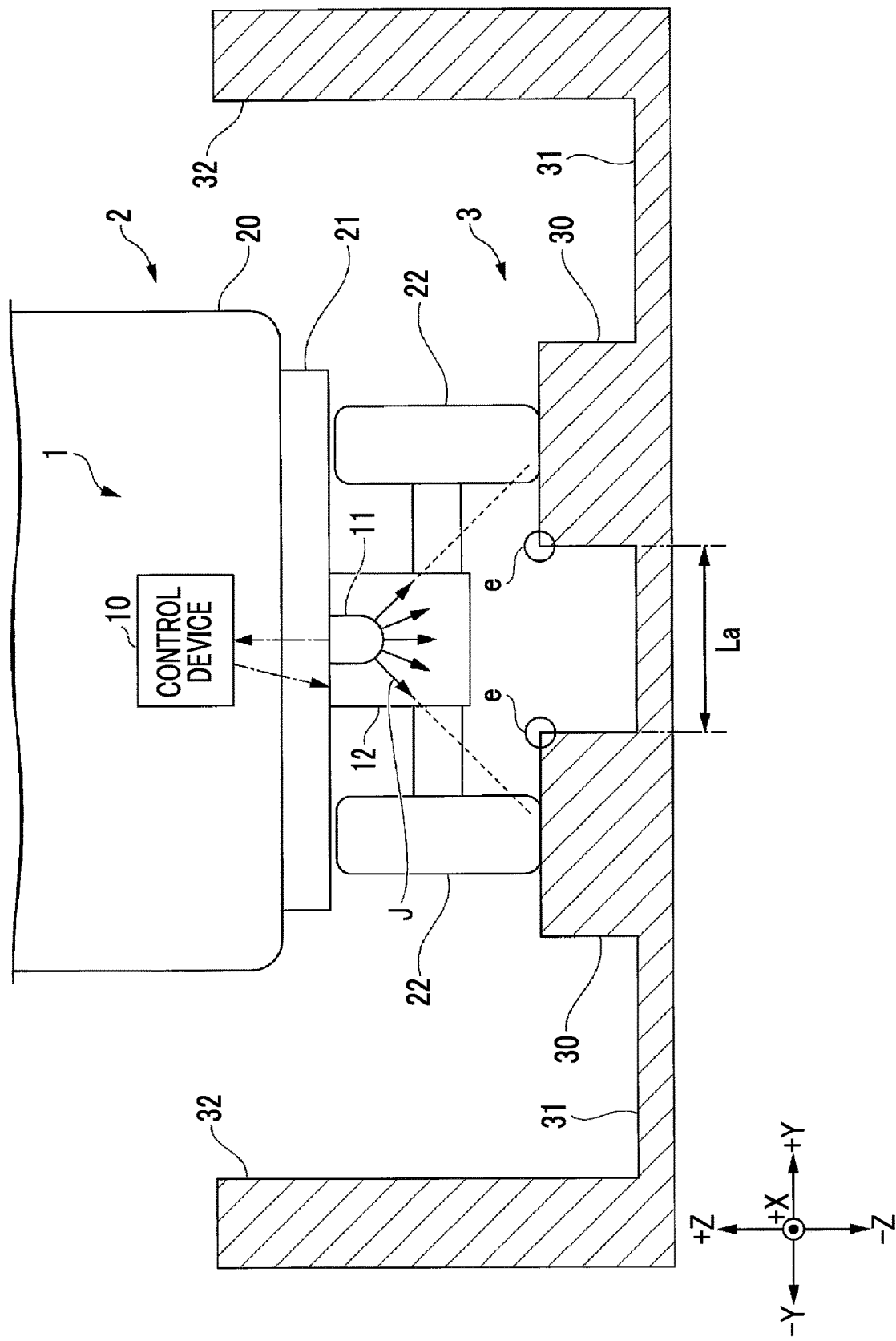
FIG. 6 is a diagram showing an overall configuration of a vehicle and a track according to a second embodiment.

FIG. 6 is a diagram showing an overall configuration of a vehicle and a track according to the second embodiment.

The distance measuring sensor 11 according to the second embodiment is a two-dimensional laser scanner, similar to the first embodiment. As shown in FIG. 6, the distance measuring sensor 11 is mounted to the center position in the vehicle width direction (the ±Y direction) of the vehicle body 20 below the bogie 21. Further, a total of two edges e, which are one end on the +Y direction side of the traveling path 30 laid on the −Y direction side of the track 3 and one end on the −Y direction side of the traveling path 30 laid on the +Y direction side of the track 3, are included in the scanning range of the distance measuring sensor 11, The interval between the two edges e in the track width direction is an interval La from the side surface on the +Y direction side of the traveling path 30 laid on the −Y direction side to the side surface on the −Y direction side of the traveling path 30 laid on the +Y direction side, and is a known value.
(Detailed Description of Function of Control Device)

Figure 7:
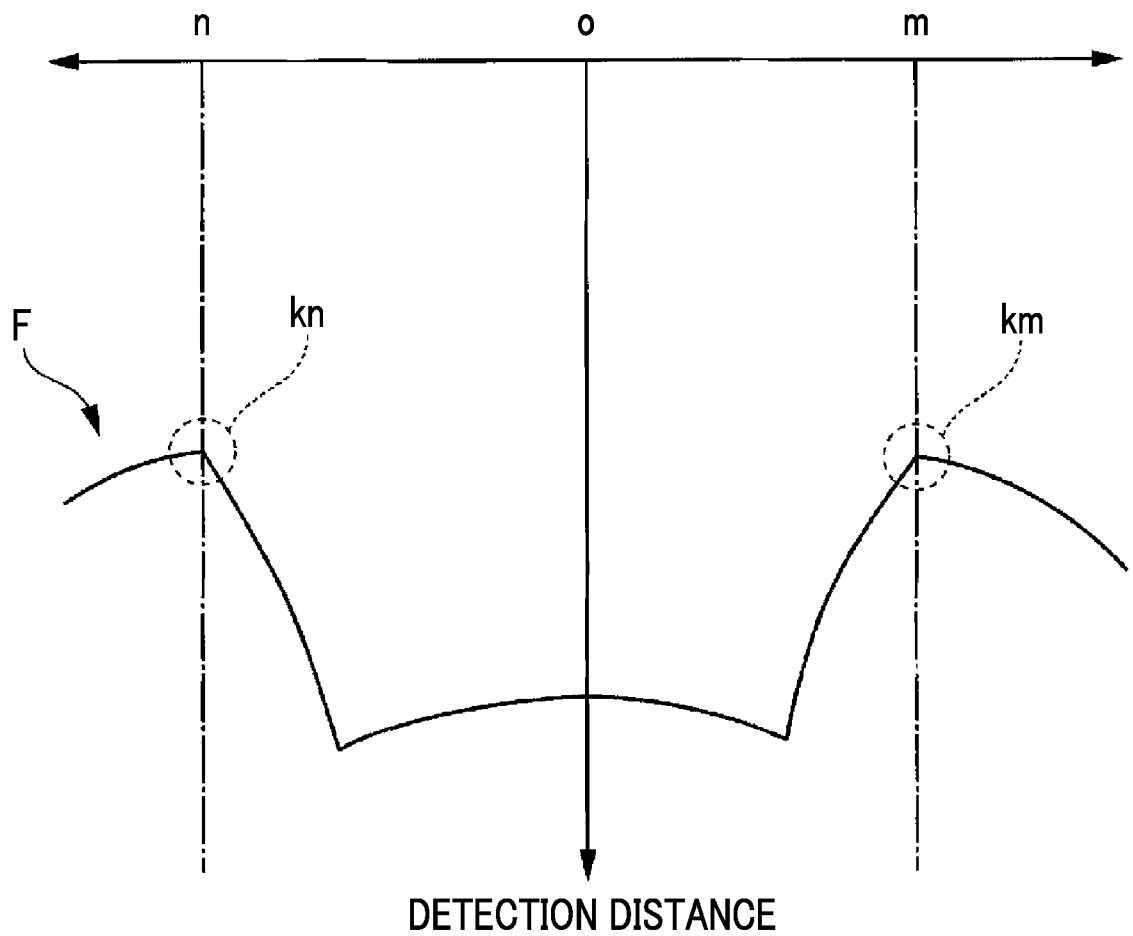
FIG. 7 is a diagram that is used for a detailed description of a function of a control device according to the second embodiment.

FIG. 7 is a diagram that is used for a detailed description of the function of a control device according to the second embodiment.

FIG. 7 is a diagram showing an example of the distance measurement data that is acquired based on one-time scanning by the distance measuring sensor 11 according to the second embodiment, and shows the relationship between the spot number and the distance from the irradiation source O to each irradiation spot with the graph F, similar to the first embodiment (FIG. 5).

Here, as shown in FIG. 6, the distance measuring sensor 11 irradiates the detection light J radially from above the space interposed between the two traveling paths 30 toward the traveling path 30 and the track floor 31. Then, the upper surface and the side surface of the traveling path 30 and the track floor 31 are continuously irradiated with the detection light J. As a result, the graph F has points km and kn at which slopes become discontinuous with the positions of the edges e (end portions of the two traveling paths 30) as boundaries, as shown in FIG. 7. The edge position detection unit 1001 extracts the points km and kn at which slopes become discontinuous from the graph F, and specifies the spot numbers m and n corresponding to the points km and kn. The points km and kn at which slopes become discontinuous can be extracted, for example, by performing a threshold value determination with respect to a function that is obtained by differentiating the graph F.

Since the processing of the control device 10 after the spot numbers m and n are specified is the same as that in the first embodiment, detailed description thereof is omitted. However, in Expression (2), the interval La between the two traveling paths 30 is used instead of the width L of the traveling path 30. Further, the reference position of the vehicle 2 in this case is the center position of the distance measuring sensor 11 mounted to the center of the vehicle body 20. Further, the reference position of the track 3 in this case is the center between the positions of the two edges e, that is, the center position of the space interposed between the two traveling paths 30.

As described above, according to the steering system 1 of the second embodiment, the distance measuring sensor 11 is mounted to the center position in the vehicle body width direction of the vehicle 2.

In this way, the deviation D between the position of the distance measuring sensor 11 and the center position of the space interposed between the two traveling paths 30 disposed side by side in the track width direction of the track 3 can be treated as the deviation between the center position of the vehicle 2 and the center position of the space interposed between the two traveling paths 30.

Further, according to the steering system 1 of the second embodiment, the distance measuring sensor 11 is mounted such that the upper surfaces of the two traveling paths 30 laid along the track 3 and disposed side by side in the track width direction are included in the scanning range.

In this way, the control device 10 can specify the position of the end portion of the traveling path 30 forming the space interposed between the two traveling paths 30 disposed side by side in the track width direction as the edge e, based on the distance measurement data that is obtained from the distance measuring sensor 11.

Third Embodiment

Next, a steering system and a vehicle according to a third embodiment will be described with reference to FIG. 8. In each drawing, identical or corresponding configurations are denoted by the same reference numerals, and description thereof is omitted appropriately.

(Overall Configuration of Vehicle and Track)

Figure 8:
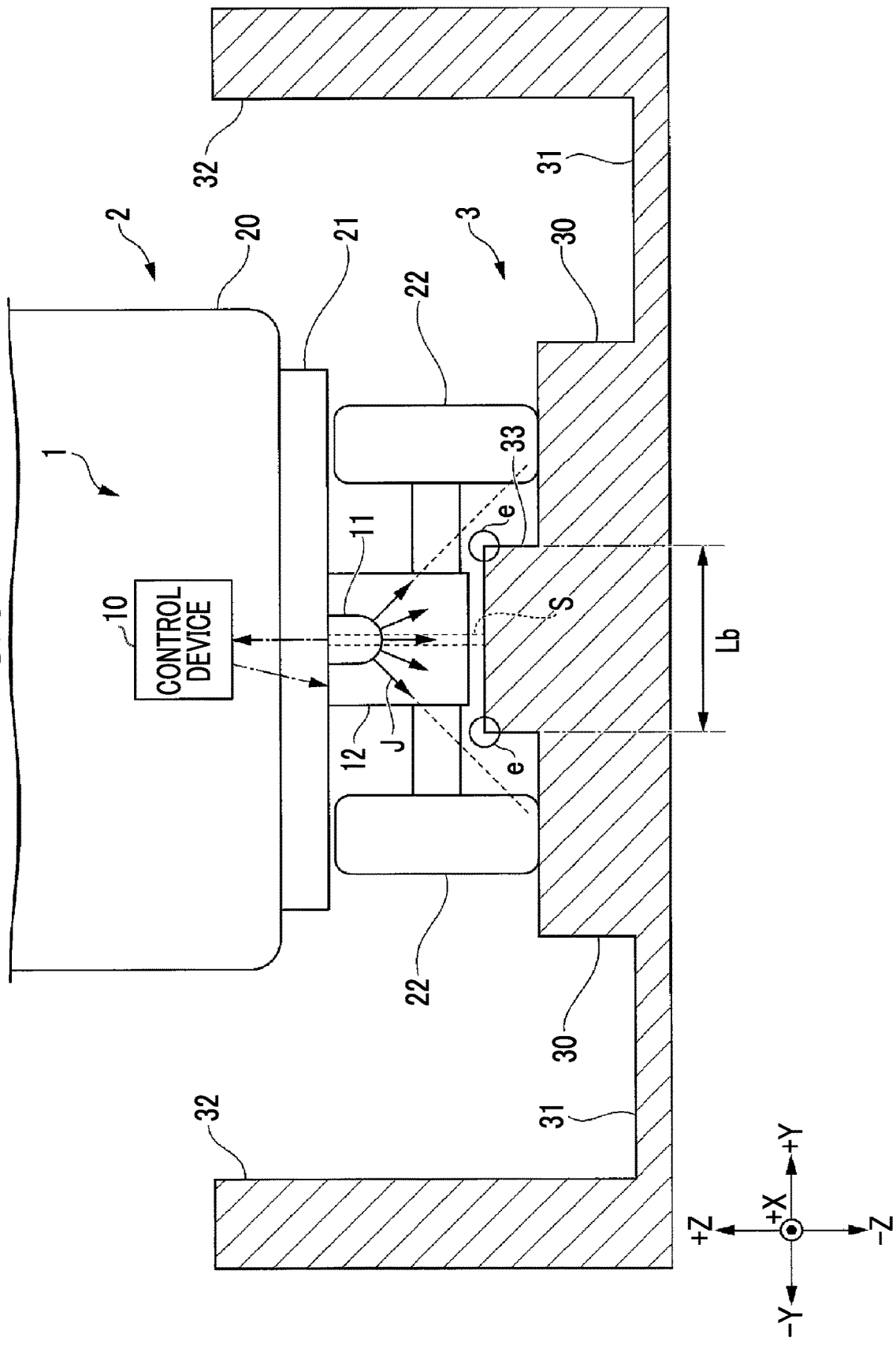
FIG. 8 is a diagram showing an overall configuration of a vehicle and a track according to a third embodiment.

FIG. 8 is a diagram showing an overall configuration of a vehicle and a track according to the third embodiment.

The distance measuring sensor 11 according to the third embodiment is a two-dimensional laser scanner, similar to the first and second embodiments. As shown in FIG. 8, the distance measuring sensor 11 is mounted to the center position in the vehicle width direction (the ±Y direction) of the vehicle body 20 below the bogie 21, similar to the second embodiment. Further, the two edges e which are both ends of a protrusion portion 33 formed in a protrusion shape on the upper surface of the traveling path 30 are included in the scanning range of the distance measuring sensor 11. The protrusion portion 33 is provided with, for example, a metal plate or the like for providing a ground by coming into contact with a ground shoe S provided at the vehicle 2.

The interval between the two edges e is a width Lb of the protrusion portion 33 in the track width direction, which is a known value.

As shown in FIG. 8, the distance measuring sensor 11 irradiates the detection light J radially from above the protrusion portion 33 (the +Z direction side) toward the protrusion portion 33 and the traveling path 30. Then, the detection light J is shielded by the upper surface of the protrusion portion 33, so that the side surface of the protrusion portion 33 and an area of a part of the upper surface 30a of the traveling path 30 are not irradiated with the detection light J. Therefore, "jumping" occurs in the distance to each irradiation spot with the edges e (both ends of the protrusion portion 33) as boundaries. Therefore, the graph showing the relationship between the spot number and the distance from the irradiation source of the distance measuring sensor 11 to each irradiation spot changes discontinuously corresponding to the position of the edge e, similar to the first embodiment (FIG. 5). In this way, the edge position detection unit 1001 can specify the position of the edge e with the same processing as in the first embodiment.

Since the processing of the control device 10 after the spot numbers m and n are specified is the same as that in the first embodiment, detailed description thereof is omitted. However, in Expression (2), the width Lb of the protrusion portion 33 is used instead of the width L of the traveling path 30. Further, the reference position of the vehicle 2 in this case is the center position of the distance measuring sensor 11 mounted to the center of the vehicle body 20, and the reference position of the track 3 is the center between the two edges e, that is, the center position of the protrusion portion 33.

As described above, according to the steering system 1 of the third embodiment, the distance measuring sensor 11 is mounted to the center position in the vehicle body width direction of the vehicle 2.

In this way, the deviation D between the position of the distance measuring sensor 11 and the center position of the protrusion portion 33 laid on the track 3 can be treated as the deviation between the center position of the vehicle 2 and the center position of the protrusion portion 33.

Further, according to the steering system 1 of the third embodiment, the distance measuring sensor 11 is mounted such that both ends of the protrusion portion 33 laid along the track 3 and in contact with the ground shoe S of the vehicle 2 are included in a predetermined range.

In this way, the control device 10 can specify the positions of both ends of the protrusion portion 33 as the edges e, based on the distance measurement data that is acquired from the distance measuring sensor 11.

Further, since the shift of the vehicle with respect to the track can be calculated by using the protrusion portion 33 laid in order to provide a ground of the vehicle 2, the cost of the entire system can be reduced.

Fourth Embodiment

Next, a steering system and a vehicle according to a fourth embodiment will be described with reference to FIG. 9. In each drawing, identical or corresponding configurations are denoted by the same reference numerals, and description thereof is omitted appropriately.

The distance measuring sensor 11 according to the fourth embodiment is a two-dimensional laser scanner, similar to the first to third embodiments. As shown in FIG. 9, the distance measuring sensor 11 is mounted to the center position in the vehicle width direction (the ±Y direction) of the vehicle body 20 below the bogie 21, similar to the second and third embodiments. Further, the two edges e which are tangent lines between the track floor 31 and the side walls 32 are included in the scanning range of the distance measuring sensor 11. That is, the distance measuring sensor 11 is disposed such that the edge e corresponding to the side wall 32 on the −Y direction side of the track 3 and the edge e corresponding to the side wall 32 on the +Y direction side are included in the scanning range.

The traveling path 30 is not laid on the track 3 according to the fourth embodiment, and the vehicle 2 travels on the track floor 31. Further, the interval between the two edges e is an interval Lc between the right and left side walls 32 in the track width direction, which is a known value.

Figure 9:
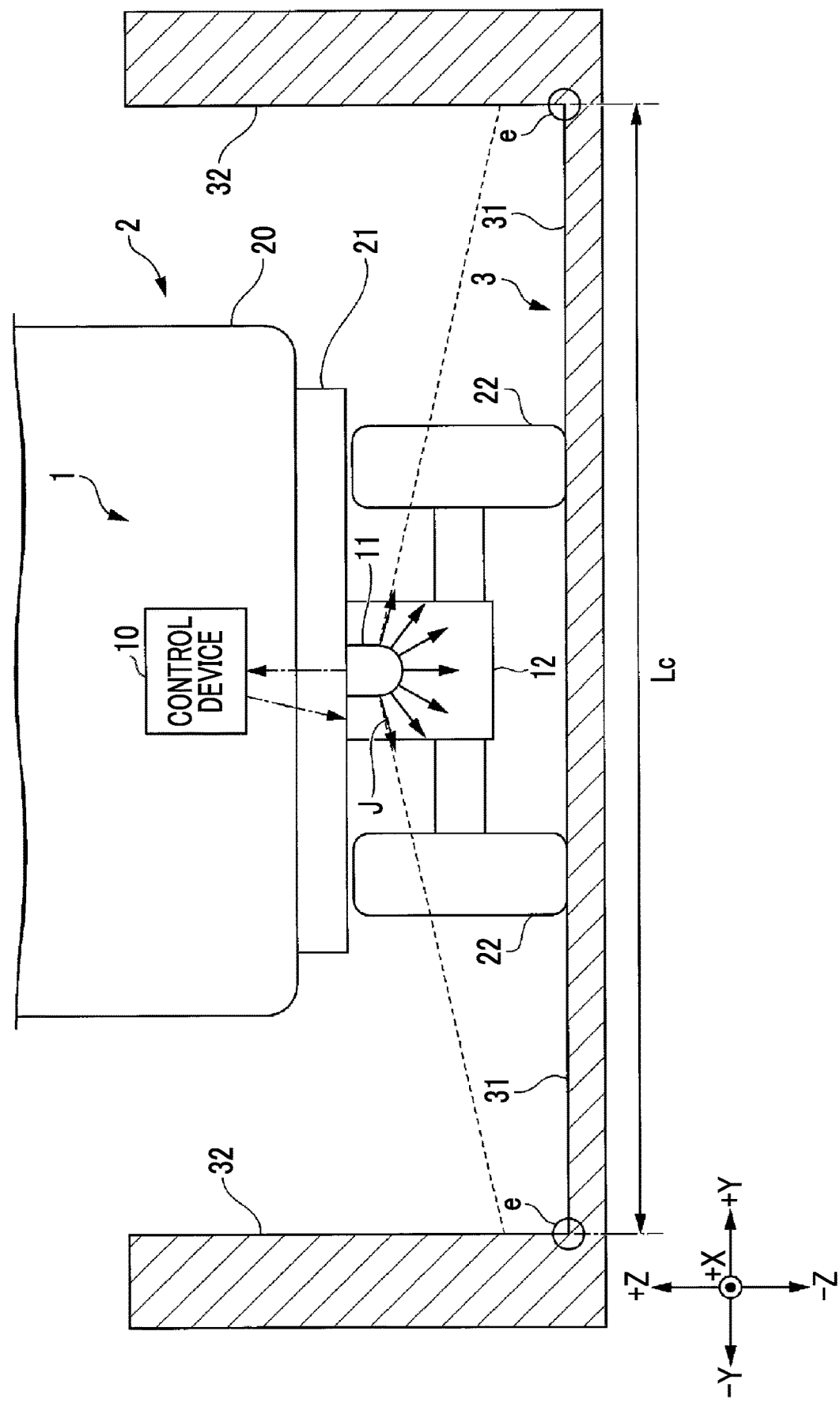
FIG. 9 is a diagram showing an overall configuration of a vehicle and a track according to a fourth embodiment.

As shown in FIG. 9, the distance measuring sensor 11 irradiates the detection light J radially over the track floor 31 and the right and left side walls 32 so as to include the tangent lines between the track floor 31 and the right and left side walls 32. Then, the irradiation with the detection light J is performed continuously over the upper surface of the track floor 31 and the side surface of the side wall 32. As a result, the distance measurement data has slopes which become discontinuous with the positions of the two edges e as boundaries. The edge position detection unit 1001 extracts points at which slopes become discontinuous, and specifies the spot numbers m and n corresponding to the points. The edge position detection unit 1001 specifies the positions of the two edges e, based on the spot numbers m and n.

Since the processing of the control device 10 after the spot numbers m and n are specified is the same as that in the first embodiment, detailed description thereof is omitted. However, in Expression (2), the interval Lc between the right and left side walls 32 in the track width direction is used instead of the width L of the traveling path 30. Further, the reference position of the vehicle 2 in this case is the center position of the distance measuring sensor 11 mounted to the center of the vehicle body 20, and the reference position of the track 3 is the center between the two edges e, that is, the center position between the right and left side walls 32 in the width direction.

As described above, according to the steering system 1 of the fourth embodiment, the distance measuring sensor 11 is mounted to the center position in the vehicle body width direction of the vehicle 2.

In this way, the deviation D between the position of the distance measuring sensor 11 and the center position of the track 3 can be treated as the deviation between the center position of the vehicle 2 and the center position of the track 3.

Further, according to the steering system 1 of the fourth embodiment, the distance measuring sensor 11 includes the tangent line between each of the side walls 32 laid at both ends of the track 3 and the track floor 31 in the scanning range.

In this way, the control device 10 can specify the position of the tangent line between the side wall 32 and the track floor 31 as the edge e, based on the distance measurement data that is acquired from the distance measuring sensor 11. Therefore, even in a case of traveling on a track in which there is no irregularity on the traveling path 30, the present invention can be applied.

Further, the number of distance measuring sensors 11 installed can be reduced as compared with a fifth embodiment to be described later. Further, in the case of the fifth embodiment to be described later, it is also conceivable that an error in the mounting positions of two distance measuring sensors 11 (particularly, an error in the mounting position in the height direction) affects the detection accuracy of the deviation D. However, in the present embodiment, since only one distance measuring sensor 11 is used, even if there is an error in the mounting position thereof, the detection accuracy of the deviation D is not affected.

Fifth Embodiment

Next, a steering system and a vehicle according to a fifth embodiment will be described with reference to FIG. 10. In each drawing, identical or corresponding configurations are denoted by the same reference numerals, and description thereof is omitted appropriately.

(Overall Configuration of Vehicle and Track)

Figure 10:
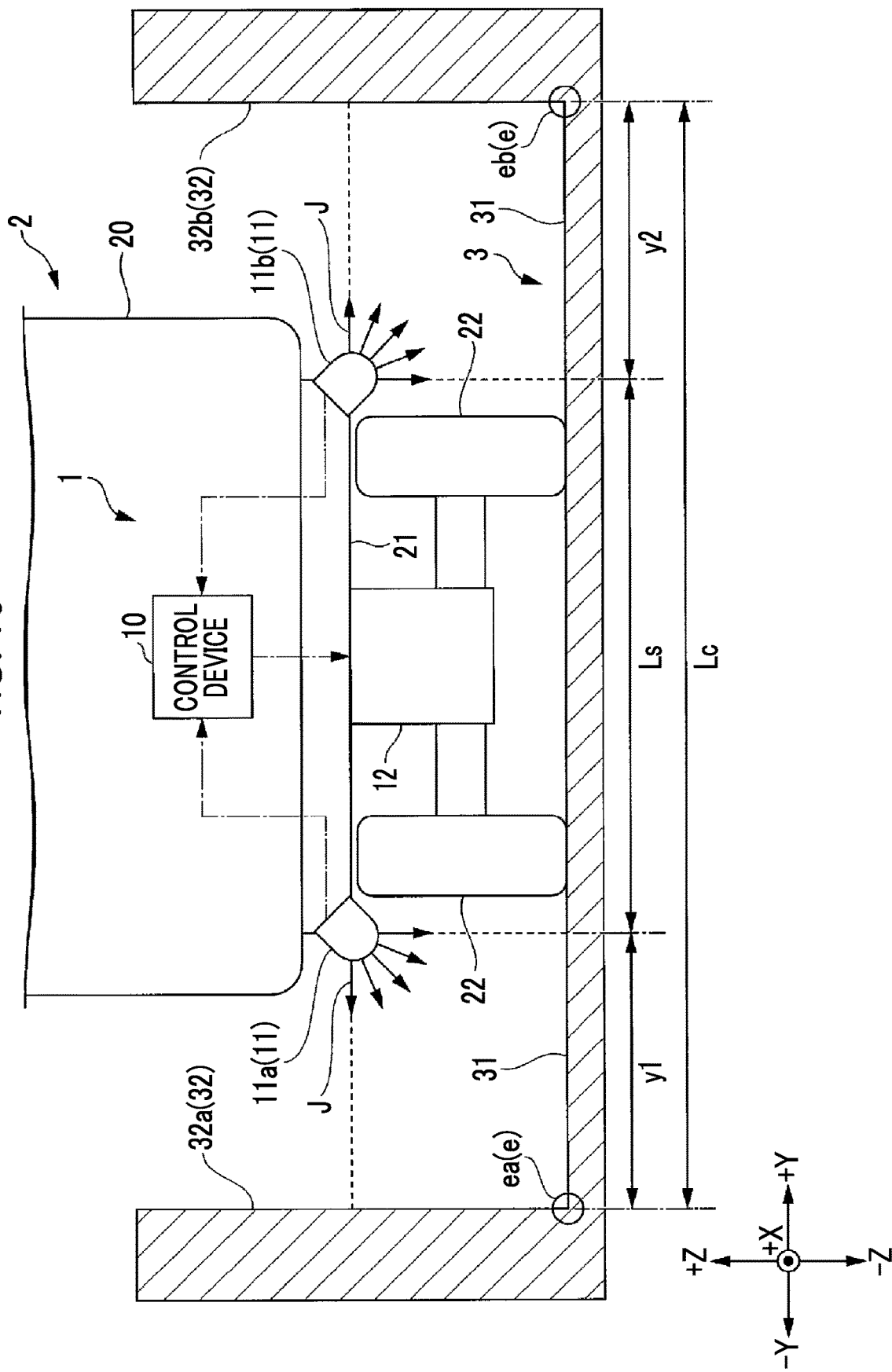
FIG. 10 is a diagram showing an overall configuration of a vehicle and a track according to a fifth embodiment.

FIG. 10 is a diagram showing an overall configuration of a vehicle and a track according to the fifth embodiment.

The distance measuring sensor 11 according to the fifth embodiment is a two-dimensional laser scanner, similar to the first to third embodiments. As shown in FIG. 10, two distance measuring sensors 11a and 11b are respectively mounted to the right and left ends in the vehicle width direction (the ±Y direction) of the vehicle body 20 below the bogie 21. Further, an edge ea which is a tangent line between the track floor 31 and the side wall 32a on the −Y direction side is included in the scanning range of the distance measuring sensor 11a disposed on the −Y direction side of the vehicle body 20. Further, an edge eb which is a tangent line between the track floor 31 and the side wall 32b on the +Y direction side is included in the scanning range of the distance measuring sensor 11b disposed on the +Y direction side of the vehicle body 20.

The traveling path 30 is not laid on the track 3 according to the fifth embodiment, and the vehicle 2 travels on the track floor 31. Further, the interval between the two edges ea and eb is the interval Lc between the right and left side walls 32a and 32b in the track width direction, which is a known value.

As shown in FIG. 10, the distance measuring sensor 11a irradiates the detection light J radially toward the track floor 31 and the side wall 32a so as to include the edge ea which is the tangent line between the upper surface of the track floor 31 and the side surface of the side wall 32a. Then, the irradiation with the detection light J is performed continuously over the upper surface of the track floor 31 and the side surface of the side wall 32a. As a result, the distance measurement data has a slope which becomes discontinuous with the position of the edge ea as a boundary. Further, the distance measuring sensor 11b irradiates the detection light J radially toward the track floor 31 and the side wall 32b so as to include the edge eb which is the tangent line between the upper surface of the track floor 31 and the side surface of the side wall 32b. Then, the irradiation with the detection light J is performed continuously over the upper surface of the track floor 31 and the side surface of the side wall 32b. As a result, the distance measurement data has a slope which becomes discontinuous with the position of the edge eb as a boundary. The edge position detection unit 1001 extracts points at which slopes become discontinuous from the distance measurement data acquired from the distance measuring sensors 11a and 11b, and specifies the spot numbers m and n corresponding to the points. In this case, the edge position detection unit 1001 sets the spot number of the detection light J that is irradiated vertically downward from the irradiation source of each of the distance measuring sensors 11a and 11b to be the "0th".

The edge position detection unit 1001 specifies the positions of the two edges ea and eb, based on the spot numbers m and n. Specifically, the edge position detection unit 1001 calculates the position y1 of the edge ea with respect to the distance measuring sensor 11a and the position y2 of the edge eb with respect to the distance measuring sensor eb, as shown in FIG. 10. The same expression (Expression (1)) as in the first embodiment can be used for a method of calculating the position y1 by the distance measuring sensor 11a and a method of calculating the position y2 by the distance measuring sensor 11b. However, in a case where the heights H of the two distance measuring sensors 11a and 11b are different from each other, the different heights are used for H which is used in Expression (1).

Next, the distance calculation unit 1002 performs the calculation of Expression (2) by using the position y1 and the position y2, and obtains the deviation D. However, in the calculation of Expression (2), in the present embodiment, instead of the width L of the traveling path 30, the value (Lc−Ls) obtained by subtracting a vehicle body width Ls from the interval Lc between the right and left side walls 32a and 32b in the track width direction is used. However, in the present embodiment, in a case where the heights H of the two distance measuring sensors 11a and 11b are different from each other, Expression (2) cannot be used. In this case, the deviation D is calculated by using only the expression in the first line of Expression (2).

Further, the reference position of the vehicle 2 in this case is the center position in the vehicle body width direction between the two distance measuring sensors 11a and 11b mounted to the right and left of the vehicle body 20, and the reference position of the track 3 is the center between the two edge ea and eb, that is, the center position between the right and left side walls 32 in the width direction.

As described above, according to the steering system 1 of the fifth embodiment, the distance measuring sensors 11a and 11b are respectively mounted to both ends of the vehicle 2 in the vehicle body width direction.

In this way, the position of the edge e can be specified with each of the two distance measuring sensors 11a and 11b. Therefore, since the number of scans of the detection light J can be increased as compared with the fourth embodiment, the resolution of the edge position can be improved.

Further, according to the steering system 1 of the fifth embodiment, the distance measuring sensor 11 includes the tangent line between each of the side walls 32 laid at both ends of the track 3 and the track floor 31 in the scanning range.

In this way, the control device 10 can specify the position of the tangent line between the side wall 32 and the track floor 31 as the edge e, based on the distance measurement data that is acquired from the distance measuring sensor 11. Therefore, even in a case of traveling on a track in which there is no irregularity on the traveling path 30, the present invention can be applied.

Sixth Embodiment

Next, a steering system and a vehicle according to a sixth embodiment will be described with reference to FIG. 11. In each drawing, identical or corresponding configurations are denoted by the same reference numerals, and description thereof is omitted appropriately.
(Overall Configuration of Vehicle and Track)
FIG. 11 is a diagram showing an overall configuration of a vehicle and a track according to the sixth embodiment.

The distance measuring sensor 11 according to the sixth embodiment is a two-dimensional laser scanner, similar to the first to third embodiments. As shown in FIG. 11, the distance measuring sensor 11 is mounted to the left end (the end on the −Y direction side) in the vehicle width direction (the ±Y direction) of the vehicle body 20 below the bogie 21. Further, one edge e of an index part 34 laid on the −Y direction side of the track floor 31 is included in the scanning range of the distance measuring sensor 11.

The traveling path 30 and the side wall 32 are not laid on the track 3 according to the sixth embodiment, and the vehicle 2 travels on the track floor 31. As shown in FIG. 11, the index part 34 is laid on the track 3 according to the sixth embodiment. The index part 34 is a protrusion-shaped structure laid along the track 3, and is provided for the purpose of using it as a target of distance measurement by the distance measuring sensor 11.

Figure 11:
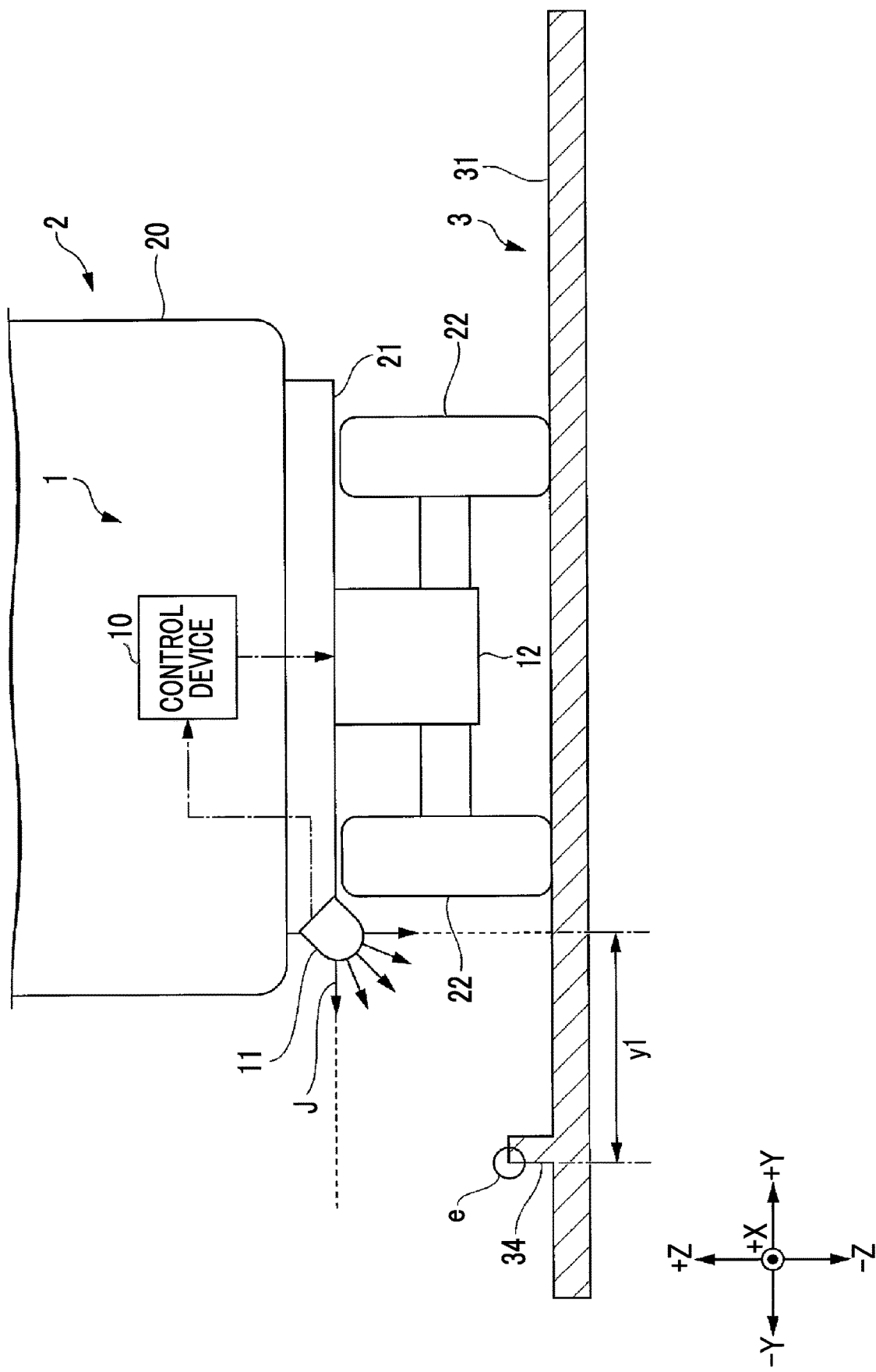
FIG. 11 is a diagram showing an overall configuration of a vehicle and a track according to a sixth embodiment.

As shown in FIG. 11, the distance measuring sensor 11 irradiates the detection light J so as to include the index part 34. Then, the irradiation with the detection light J is performed continuously over the upper surface of the track floor 31 and the side surface and the upper surface of the index part 34. As a result, the edge position detection unit 1001 extracts a point where "jumping" occurs in a distance, from the distance measurement data acquired from the distance measuring sensor 11, and specifies the spot number m corresponding to the point. In this case, the edge position detection unit 1001 sets the spot number of the detection light J that is irradiated vertically downward from the irradiation source of the distance measuring sensor 11 to be the "0th".

The edge position detection unit 1001 specifies the position of the edge e, based on the spot number m. Specifically, the edge position detection unit 1001 calculates the position y1 of the edge e with respect to the distance measuring sensor 11, as shown in FIG. 11. The same expression (Expression (1)) as in the first embodiment can be used in a method of calculating the position y1.

Next, the distance calculation unit 1002 obtains the deviation D by using the position y1. Here, it is assumed that the distance calculation unit 1002 has a position target value y1 determined in advance as a target value of the position of the end portion (edge e) of the index part 34 with respect to the distance measuring sensor 11. Then, the distance calculation unit 1002 sets the deviation between the position target value y1 and the position y1 obtained by the edge position detection unit 1001 as the deviation D. The reference position of the vehicle 2 in this case is the position of the distance measuring sensor 11, and the reference position of the track 3 is the position of the end portion (edge e) of the index part 34.

As described above, according to the steering system 1 of the sixth embodiment, the distance measuring sensor 11 is mounted so as to include the index part 34 provided on the track 3 as a target of distance measurement by the distance measuring sensor 11.

In this way, the control device 10 can specify the position of the index part 34 of the track 3 as the edge e, based on the distance measurement data which is acquired from the distance measuring sensor 11. Therefore, even in a case of traveling on a track having no irregularity on the traveling path 30 and no side wall 32, the vehicle can travel based on the positional relationship with the index part 34 provided as the target of distance measurement by the distance measuring sensor 11.

In the sixth embodiment, the index part 34 has been described as a structure provided in a protrusion shape on the flat track floor 31. However, in other embodiments, there is no limitation to this aspect. For example, the index part 34 may be a structure provided in a recess shape in the flat track floor 31.

Modification Example

The embodiments of the present invention have been described above with reference to the drawings. However, the specific configurations are not limited to the above embodiments, and also include design changes or the like within a scope which does not deviate from the gist of the present invention.

For example, the distance measuring sensor 11 of each of the above embodiments has been described as being a laser scanner. However, in other embodiments, there is no limitation to this aspect. The distance measuring sensor 11 may be, for example, a sensor that measures a distance by using ultrasonic waves or the like.

Further, the vehicle 2 of each of the above embodiments has been described as a vehicle traveling with the rubber tires 22. However, the vehicle to which the steering system 1 can be applied is not limited to this aspect. In other embodiments, the steering system 1 is also applicable to vehicles with iron wheels.

Figure 12:
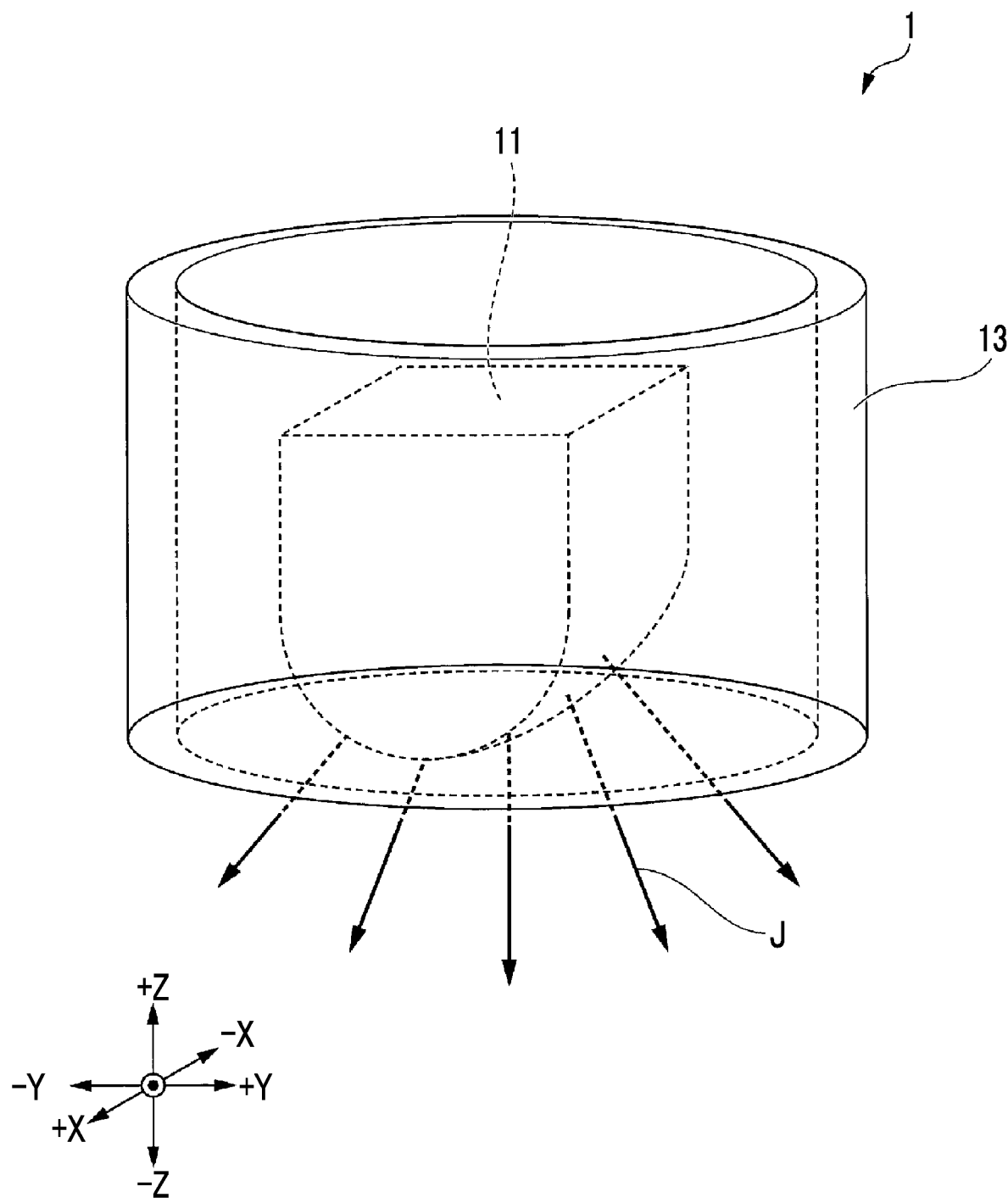
FIG. 12 is a diagram showing a structural feature of a steering system according to a modification example of each embodiment.

FIG. 12 is a diagram showing a structural feature of a steering system according to a modification example of each embodiment.

As shown in FIG. 12, the steering system 1 according to the modification example of each embodiment is further provided with a cover 13 which is open on the lower side (the −Z direction side) while surrounding the width direction (the ±Y direction) and the front-rear direction (the ±X direction) of the distance measuring sensor 11.

Such a cover 13 is provided, whereby the distance measuring sensor 11 can be protected from water droplets, mud, dust, or the like during traveling. Further, since the lower side is open, a configuration is made in which the cover 13 does not interfere with the distance measurement of the distance measuring sensor 11. In this way, it is possible to reduce erroneous detection of distance measurement by the distance measuring sensor 11.

INDUSTRIAL APPLICABILITY

According to each aspect of the present invention, it is possible to accurately detect the distance between an ideal position on the track and an actual position of the vehicle.

REFERENCE SIGNS LIST

1: steering system (position detection system)
10: control device
100: CPU
1000: distance measurement data acquisition unit
1001: edge position detection unit
1002: distance calculation unit
1003: steering control unit
101: memory
102: storage
103: communication interface
11: distance measuring sensor
12: steering mechanism
13: cover
2: vehicle
20: vehicle body
21: bogie
22: rubber tire (wheel)
3: track
30: traveling path
30*a*: upper surface of traveling path
30*b*: side surface of traveling path
31: track floor
32: side wall
33: protrusion portion
34: index part

The invention claimed is:

1. A position detection system comprising:
a distance measuring sensor mounted to a vehicle traveling along a track, and having an irradiation source, the distance measuring sensor configured to
irradiate detection light in a plurality of directions from the irradiation source within a predetermined range in a track width direction of the track, and
measure a distance over the predetermined range in the track width direction to obtain distance measurement data; and
a processor configured to
detect a position of an edge of a traveling path or a track floor in the track width direction of the track, based on the distance measurement data obtained by the distance measuring sensor, and
calculate a distance in the track width direction between a reference position of the track, which is specified from the position of the edge, and a reference position of the vehicle to which the distance measuring sensor is mounted, wherein
the edge is an intersection line at which two faces facing in different directions of surfaces of a structure configuring the track intersect each other, and
the processor is configured to
specify the reference position of the track, based on positions of two or more edges of the traveling path or the track floor, which are located at a same vertical height, and
determine the distance in the track width direction between the reference position of the track and the reference position of the vehicle by an equation as follows:

$$D = L/2 - (L \times y1)/(y1 + y2)$$
$$= L/2 - (L \times H \times \tan(n \times \Theta))/(H \times \tan(n \times \Theta) + H \times \tan(m \times \Theta)),$$
$$= L/2 - (L \times \tan(n \times \Theta))/(\tan(n \times \Theta) + \tan(m \times \Theta))$$

wherein
reference L is a width of the track in the track width direction,
reference y1 is a first position of one of the two or more edges at one side along the track width direction with respect to the reference position of the vehicle,
reference y2 is a second position of another of the two or more edges at another side opposite to the one side along the track width direction with respect to the reference position of the vehicle,
reference H is a distance between the irradiation source and the track,
reference n is a first irradiation spot corresponding to a first end portion of the predetermined range at the one side along the track width direction, reference m is a second irradiation spot corresponding to a second end portion of the predetermined range at the another side along the track width direction, and reference θ is an angle interval of the detection light.

2. The position detection system according to claim 1, wherein the distance measuring sensor is mounted on a front side of a wheel in a vehicle traveling direction.

3. The position detection system according to claim 2, wherein the distance measuring sensor is mounted within a distance range in which an interval between the distance measuring sensor and the wheel in the vehicle traveling direction is smaller than a diameter of the wheel.

4. The position detection system according to claim 1, wherein the distance measuring sensor is mounted such that both ends of the traveling path laid along the track are included in the predetermined range.

5. The position detection system according to claim 4, wherein the distance measuring sensor is mounted such that a center position of the distance measuring sensor is within a range in a width direction of a wheel that rotates and moves on an upper surface of the traveling path.

6. The position detection system according to claim 1, wherein the distance measuring sensor is mounted to a center position in a vehicle body width direction of the vehicle.

7. The position detection system according to claim 6, wherein the distance measuring sensor is mounted such that upper surfaces of two traveling paths laid along the track and disposed side by side in the track width direction are included in the predetermined range.

8. The position detection system according to claim 6, wherein the distance measuring sensor is mounted such that both ends of a protrusion portion that is laid along the track and comes into contact with a ground shoe of the vehicle are included in the predetermined range.

9. The position detection system according to claim 1, wherein the distance measuring sensor is mounted to each of both ends in a vehicle body width direction of the vehicle.

10. The position detection system according to claim 1, wherein the distance measuring sensor is located such that a scanning range of the distance measuring sensor includes the intersection line between each of side walls laid at both ends of the track and the track floor.

11. The position detection system according to claim 1, wherein the distance measuring sensor is mounted so as to include an index part provided on the track as a target of distance measurement by the distance measuring sensor.

12. The position detection system according to claim 1, wherein the distance measuring sensor is mounted such that a surface of the track, which is not irradiated with the detection light due to the detection light being shielded by the traveling path, is created.

13. The position detection system according to claim 1, wherein when a scanning with the detection light in the plurality of directions is performed by irradiating the detection light along the track width direction while changing the irradiation angle, the processor is configured to specify a portion in which a distance from the distance measuring sensor to an irradiation spot changes discontinuously with respect to the irradiation angle of the detection light, or a portion in which a slope of a distance from the distance measuring sensor to the irradiation spot with respect to the irradiation angle changes discontinuously, as an edge position.

14. The position detection system according to claim 1, wherein the processor is configured to control a steering mechanism of the vehicle to reduce the distance in the track width direction between the reference position of the track, which is specified from the position of the edge, and the reference position of the vehicle to which the distance measuring sensor is mounted.

15. The position detection system according to claim 1, further comprising:

a cover surrounding the distance measuring sensor and having a bottom surface that is open.

16. A vehicle comprising:

the position detection system according to claim 1.

17. A position detection method comprising:

irradiating, by an irradiation source of a distance measuring sensor mounted to a vehicle traveling along a track, detection light in a plurality of directions within a predetermined range in a track width direction of a track;

measuring, by the distance measuring sensor, a distance over the predetermined range in the track width direction to obtain distance measurement data;

detecting a position of an edge of a traveling path or a track floor in the track width direction of the track, based on the distance measurement data obtained by the distance measuring sensor; and calculating a distance in the track width direction between a reference position of the track, which is specified from the position of the edge, and a reference position of the vehicle to which the distance measuring sensor is mounted, wherein the edge is an intersection line at which two faces facing in different directions of surfaces of a structure configuring the track intersect each other, and the method further comprises specifying the reference position of the track, based on positions of two or more edges of the traveling path or the track floor, which are located at a same vertical height, and determining the distance in the track width direction between the reference position of the track and the reference position of the vehicle by an equation as follows:

$$D = L/2 - (L \times y1)/(y1 + y2)$$
$$= L/2 - (L \times H \times \tan(n \times \Theta))/(H \times \tan(n \times \Theta) + H \times \tan(m \times \Theta)),$$
$$= L/2 - (L \times \tan(n \times \Theta))/(\tan(n \times \Theta) + \tan(m \times \Theta))$$

wherein reference L is a width of the track in the track width direction, reference y1 is a first position of one of the two or more edges at one side along the track width direction with respect to the reference position of the vehicle, reference y2 is a second position of another of the two or more edges at another side opposite to the one side along the track width direction with respect to the reference position of the vehicle, reference H is a distance between the irradiation source and the track, reference n is a first irradiation spot corresponding to a first end portion of the predetermined range at the one side along the track width direction, reference m is a second irradiation spot corresponding to a second end portion of the predetermined range at the another side along the track width direction, and reference $\theta$ is an angle interval of the detection light.

* * * * *